US012435538B2

(12) United States Patent
Hu

(10) Patent No.: US 12,435,538 B2
(45) Date of Patent: Oct. 7, 2025

(54) LOCK BODY LOCATED OUTSIDE THE DOOR FOR QUICK ASSEMBLY OF HANDLE

(71) Applicant: Mingjun Hu, Fenghua (CN)

(72) Inventor: Mingjun Hu, Fenghua (CN)

( * ) Notice: Subject to any disclaimer, the term of this patent is extended or adjusted under 35 U.S.C. 154(b) by 261 days.

(21) Appl. No.: 18/314,357

(22) Filed: May 9, 2023

(65) Prior Publication Data

US 2023/0272642 A1 Aug. 31, 2023

(30) Foreign Application Priority Data

Mar. 22, 2023 (CN) ........................ 202310281091.X

(51) Int. Cl.
*E05B 3/04* (2006.01)

(52) U.S. Cl.
CPC ..................................... *E05B 3/04* (2013.01)

(58) Field of Classification Search
CPC ........................................................ E05B 3/04
See application file for complete search history.

(56) References Cited

U.S. PATENT DOCUMENTS 7,188,873 B2 * 3/2007 Brown .................... E05B 63/04 292/336.3
2008/0111384 A1 * 5/2008 Ellis ........................ E05B 3/065 292/336.3
2008/0178640 A1 7/2008 Davis
2008/0252086 A1 * 10/2008 Houis ........................ E05B 3/00 292/348
2009/0146439 A1 * 6/2009 Watts ...................... E05B 3/065 292/348
2010/0225128 A1 * 9/2010 Engel ...................... E05B 83/02 292/336.3
2010/0259053 A1 * 10/2010 Cramer ..................... E05B 3/06 292/354
2013/0009410 A1 * 1/2013 Ludwig ............... E05B 15/1635 292/336.3
2013/0015672 A1 * 1/2013 Nadgouda ............. E05B 13/005 292/202
2013/0168978 A1 * 7/2013 Huang .................. E05B 13/101 292/336.3
2013/0292954 A1 * 11/2013 Zhang ..................... E05B 59/00 292/33
2014/0214101 A1 7/2014 Roethlisberger et al.
2015/0308150 A1 * 10/2015 Ludwig .................. E05B 3/065 292/336.3

(Continued)

*Primary Examiner* — Mark A Williams
(74) *Attorney, Agent, or Firm* — Hemisphere Law, PLLC; Zhigang Ma

(57) ABSTRACT

The present disclosure relates to the technical field of locks, and discloses an outer lock body for quick assembly of a handle, including a mounting seat and a handle, where the handle includes a rotating part and a hand-held part, the rotating part is inserted into and fitted with the mounting seat, a quick assembly mechanism is provided in the mounting seat, the quick assembly mechanism includes a limiting body, a limiting ring groove recessed on the rotating part, a holding part, and a push-in member, and with the push-in action of the push-in member, a holding part is pushed open and the limiting body is pushed to partially enter the limiting ring groove. According to the outer lock body, the handle can be quickly disassembled and the direction of the hand-held part can be changed.

11 Claims, 11 Drawing Sheets

(56) References Cited

U.S. PATENT DOCUMENTS

| | | | | |
|---|---|---|---|---|
| 2016/0017634 | A1* | 1/2016 | Parker | E05B 1/003 292/357 |
| 2016/0201354 | A1* | 7/2016 | Lehner, Jr. | E05B 3/06 292/336.3 |
| 2019/0226235 | A1 | 7/2019 | Xiao et al. | |

* cited by examiner

LOCK BODY LOCATED OUTSIDE THE DOOR FOR QUICK ASSEMBLY OF HANDLE

TECHNICAL FIELD

The present disclosure relates to the technical field of locks, in particular to a lock body located outside the door for quick assembly of a handle.

BACKGROUND ART

A lock body includes a lock body located outside the door and an inner lock body located inside the door, an outer handle of the lock body located outside the door is connected to an inner handle of the inner lock body via a transmission rod in the form of a rectangular parallelepiped, and a control structure is provided on the inner lock body for limiting the rotational stroke of a transmission shaft so as to control the rotational angle range of the handle within 90°.

With regard to the structure of the lock body, reference can be made to a door lock disclosed in China patent publication No. CN210530508 U, including a first box body, a first handle and a first lock cylinder rotating member provided in the first box body and connected to the first handle; and a second box body, a second handle and a second lock cylinder provided in the second box body and connected to the second handle, two ends of a transmission rod are fixedly connected to the first lock cylinder rotating member and a second lock cylinder rotating element respectively, a limiting groove is provided on the first box body, two symmetrically provided protruding columns on the first lock cylinder rotating member extend into limiting grooves, the protruding column moves in the limiting groove, and the length of the limiting groove limits the rotation angle of the first handle to be within 90°.

In the above-mentioned structure, the rotation angle of the inner and outer handles is controlled within 90° by the cooperation of the limiting groove and the protruding column, and during mounting, an operator needs to mount the lock body located outside the door first and then mount the inner lock body, and in the process of mounting the inner lock body, the connection and cooperation between the transmission rod and the first lock cylinder rotating member and the second lock cylinder rotating cylinder and the cooperation between the limiting groove and the protruding column are completed.

With the support of the above-mentioned prior art, the existing lock body has the following problems: the existing handle, with respect to the box body, determines a mounting method suitable for a right-handed person when leaving the factory; and the handle is riveted to rotatably fit with the box body, and the handle cannot be detached from the box body once being mounted, which results in that, for a consumer with different hand using habits such as a left-handed person, when mounting a door lock, the mounting orientation of the handle required for the user cannot be changed, resulting in inconvenience in subsequent use.

SUMMARY OF THE DISCLOSURE

Directing at the defect in the prior art that a handle and a mounting seat are assembled and cannot be disassembled, resulting in the problem that a lock body cannot be applied to users with different left and right hand using habits, the present disclosure provides a lock body located outside the door for quick assembly of a handle.

In order to solve the above technical problem, the present disclosure is achieved through the following technical solution.

A lock body located outside the door for quick assembly of a handle, including a mounting seat and a handle, where the handle includes a rotating part and a hand-held part extending perpendicularly to one side at one end of the rotating part, the end of the rotating part away from the hand-held part is inserted into and fitted with the mounting seat, a quick assembly mechanism for realizing axial limiting of the rotating part relative to the mounting seat with the rotation of the rotating part by a particular angle after the rotating part is inserted into a designated position is provided in the mounting seat, the quick assembly mechanism includes a limiting body, a limiting ring groove recessed on the outer ring wall of the rotating part away from the hand-held part, a holding part which drives the limiting body to float outside the limiting ring groove, and a push-in member which deviates from the hand-held part in the axial direction of the rotating part with the rotation of the rotating part, and with the push-in action of the push-in member, a holding part is pushed open and the limiting body is pushed to partially enter the limiting ring groove.

With the above-mentioned solution, the handle and the mounting seat are quickly assembled by means of the quick assembly mechanism, and the assembly process includes after the rotating part of the handle is inserted into the mounting seat, the axial limiting of the handle and the mounting seat can be realized by rotating at a particular angle, and the principle is that the rotation of the handle can drive the push-in member to carry out a push-in action, the push-in member can drive the holding part to open, the limiting body accommodated in the holding part is locally pushed into the limiting ring groove, and the limiting body is locally located in the mounting seat and partially embedded in the limiting ring groove of the rotating part, so as to realize the axial limiting of the handle relative to the mounting seat. Since the limiting ring groove of the handle is annular, the handle can rotate relative to the mounting seat. Before an inner lock body is mounted, the above-mentioned structure merely needs to press the holding part from the end of the mounting seat away from the handle, so that the rolling body can be driven to disengage from the limiting ring groove again and the handle disengages from the mounting seat. Therefore, the above-mentioned solution can change the direction of the hand-held part of the handle according to user's usage habits.

Preferentially, the limiting body is a rolling body, and at least one rolling body is distributed in the circumferential direction around the rotating part.

With the above-mentioned solution, the limiting body being the rolling body has the advantage that not only the axial limiting of the handle relative to the mounting seat can be achieved, but also the sliding friction between the limiting body and the limiting ring groove can be changed into a rolling friction, so as to improve the lubrication of the rotation of the handle.

Preferentially, the holding part includes a first holding ring and a second holding ring which are provided separately, grooves which can accommodate the partial rolling body are provided on the opposite sides of the first holding ring and the second holding ring, and the rolling body is configured to be completely accommodated between the two grooves or partially disengaging to enter the limiting ring groove as the distance between the first holding ring and the second holding ring changes.

With the above-mentioned solution, the distance between the first holding ring and the second holding ring gradually increases with the push-in action of the push-in ring, and the rolling body changes from being completely accommodated between the first holding ring and the second holding ring to partially entering the limiting ring groove.

Preferentially, the bottom and the side wall of the groove form arc-shaped transition to fit with the rolling body, the push-in member is a push-in ring sleeving the exterior of the holding part, and the inner ring wall of the push-in ring is provided with, at the end away from the hand-held part, an arc-shaped groove which can accommodate the partial rolling body.

With the above-mentioned solution, due to the push-in action of the push-in ring, the first holding ring can be stably pushed away from the second holding ring, and the arc-shaped transition at the bottom of the groove is combined with the arc-shaped groove of the push-in ring, when the first holding ring is close to the second holding ring, the rolling body can be limited and the rolling body can be driven to roll smoothly; and with the push-in action of the push-in ring, the arc-shaped groove can drive the rolling body to move smoothly downwards until the rolling body partially enters the limiting ring groove.

Preferentially, the mounting seat is provided with a through groove for the hand-held part to be inserted in, in the mounting seat, an accommodating ring for accommodating the push-in ring extends around the through groove, and a baffle for limiting the maximum movement stroke of the first holding ring is detachably provided at the end of the mounting seat away from the handle.

With the above-mentioned solution, the baffle is provided for limiting the maximum movement stroke of the first holding ring so as to limit that the first holding ring and the push-in ring disengage from the mounting seat while ensuring that the rolling body partially enters the limiting ring groove along with the push-in action of the push-in ring.

Preferentially, an engagement structure is provided between the mounting seat, the quick assembly mechanism and the handle, and the engagement mechanism includes a synchronization mechanism provided between the rotating part, the first holding ring and the push-in ring for driving the rotating part, the first holding ring and the push-in ring to rotate synchronously, and a push-in mechanism provided between the push-in ring and the mounting seat for driving the push-in ring to achieve the push-in action in the axial direction of the rotating part during rotation.

With the above-mentioned solution, since the push-in ring, the first holding ring and the rotating part are in synchronous rotation, when there is the push-in mechanism between the push-in ring and the mounting seat, the push-in part can be driven to perform the push-in action towards the first holding ring, increasing the distance between the first holding ring and the second holding ring and partially pushing and pressing the rolling body into the limiting ring groove.

Preferentially, the synchronous rotation mechanism includes a first inserting groove recessed at the end of the rotating part away from the hand-held part and a first inserting block protruding on the inner ring wall of the first holding ring and configured to be inserted into the first inserting groove, a second inserting block protrudes on the outer wall of the first holding ring, and a second inserting groove for the second inserting block to be inserted in is provided on the side of the push-in ring facing the first holding ring.

With the above-mentioned solution, the first inserting block provided on the first holding ring is inserted into and fitted with the first inserting groove of the handle, and the second inserting block on the first holding ring is inserted into and fitted with the second inserting groove on the push-in ring, thus achieving synchronous rotation of the three.

Preferentially, the push-in mechanism includes a sliding block protruding from the end of the push-in ring close to the hand-held part, an fitting surface provided on the side of the mounting seat away from the hand-held part, and a sliding groove recessed in the circumferential direction around the through groove on the fitting surface and configured for the sliding block to be embedded and slide, a lead-out mechanism facilitating the sliding block to disengage from the sliding groove to fit with the fitting surface being provided between the sliding block and the sliding groove, and the push-in distance of the push-in ring is the depth at which the push-in ring is inserted into the sliding groove.

With the above-mentioned solution, it is possible to switch the two states that the sliding block is inserted into the sliding groove or fitted with the fitting surface by means of the lead-out mechanism, which enables the push-in ring to be pushed in the direction of a first holder to the depth at which the push-in ring is previously inserted into the ring groove.

Preferentially, the lead-out mechanism includes first guide slopes provided on both sides of the sliding block and second guide slopes provided on both sides of the sliding groove and fitted with the first guide slopes.

With the above-mentioned solution, when the sliding block moves until the first guide slope fits with the second guide slope, as the handle continues to rotate, the sliding block on the push-in ring is driven to gradually slide out of the sliding groove, and as the sliding block slides out of the sliding groove, correspondingly, the push-in ring makes a push-in movement in the direction of the first holding ring.

Preferentially, at least one set of sliding grooves is distributed in a spaced mode in the axial direction of the rotating part, at least one sliding groove is provided for each set of sliding grooves, and each set of sliding grooves is concentrically provided with different circles, and the angle difference between each set of sliding grooves is greater than the rotating stroke after the rotating part is mounted.

With the above-mentioned solution, only one or more sliding grooves are needed for each set of sliding grooves to cooperate with a corresponding number of sliding blocks on the push-in ring so as to achieve the push-in action of the push-in ring, and one or more sets of sliding grooves are provided, where each set of sliding grooves is provided concentrically with different circles, and the angle difference between each set of sliding grooves is greater than the rotating stroke after the rotating part is mounted; and within the rotation stroke of the handle, the push-in ring can achieve the push-in action of a sufficient distance, and the push-in ring locally pushes the rolling body into the limiting groove so as to achieve axial limiting between the handle and the mounting seat.

Preferentially, a holding mechanism for holding the hand-held part in a horizontal state after the rotating part is inserted into the through groove is provided between the push-in ring and the mounting seat, the holding mechanism including two tangent planes provided in parallel on the outer wall of the push-in ring, and a moving block provided on the mounting seat by elastic sliding and configured to be close to or away from the push-in ring, the side of the moving block close to the tangent plane being a plane fitted with the tangent plane, and an elastic member which drives the moving block to elastically abut against the tangent plane is provided between the mounting seat and the moving block.

With the above-mentioned solution, the holding mechanism can ensure that the hand-held part is still in the horizontal state when the handle is inserted. This arrangement has the advantage that the handle still remains the horizontal state when the axial limiting between the handle and the mounting seat is achieved.

With the above technical solution, the present disclosure has significant technical effects.

The handle and the mounting seat are quickly assembled by means of the quick assembly mechanism, the rotation of the handle can drive the push-in member to carry out a push-in action, the push-in member can drive the holding part to open, the limiting body accommodated in the holding part is locally pushed into the limiting ring groove, and the limiting body is locally located in the mounting seat and partially embedded in the limiting ring groove of the rotating part, so as to realize the axial limiting of the handle relative to the mounting seat. Since the limiting ring groove of the handle is annular, the handle can rotate relative to the mounting seat. Before an inner lock body is mounted, the above-mentioned structure merely needs to press the holding part from the end of the mounting seat away from the handle, so that the rolling body can be driven to disengage from the limiting ring groove again and the handle disengages from the mounting seat. Therefore, the above-mentioned solution can change the direction of the hand-held part of the handle according to user's usage habits.

2. The principle at which the first holding ring is pushed in by the push-in ring is that the sliding block on the push-in ring and the sliding groove in the mounting seat are switched from the inserting state to the lead-out state under the action of the lead-out mechanism and the synchronization mechanism, the push-in distance of the push-in member is the inserting depth of the sliding block in the sliding groove, and the push-in member jacks the first holding ring and locally pushes and presses the rolling body into the limiting ring groove.

Figure 1:
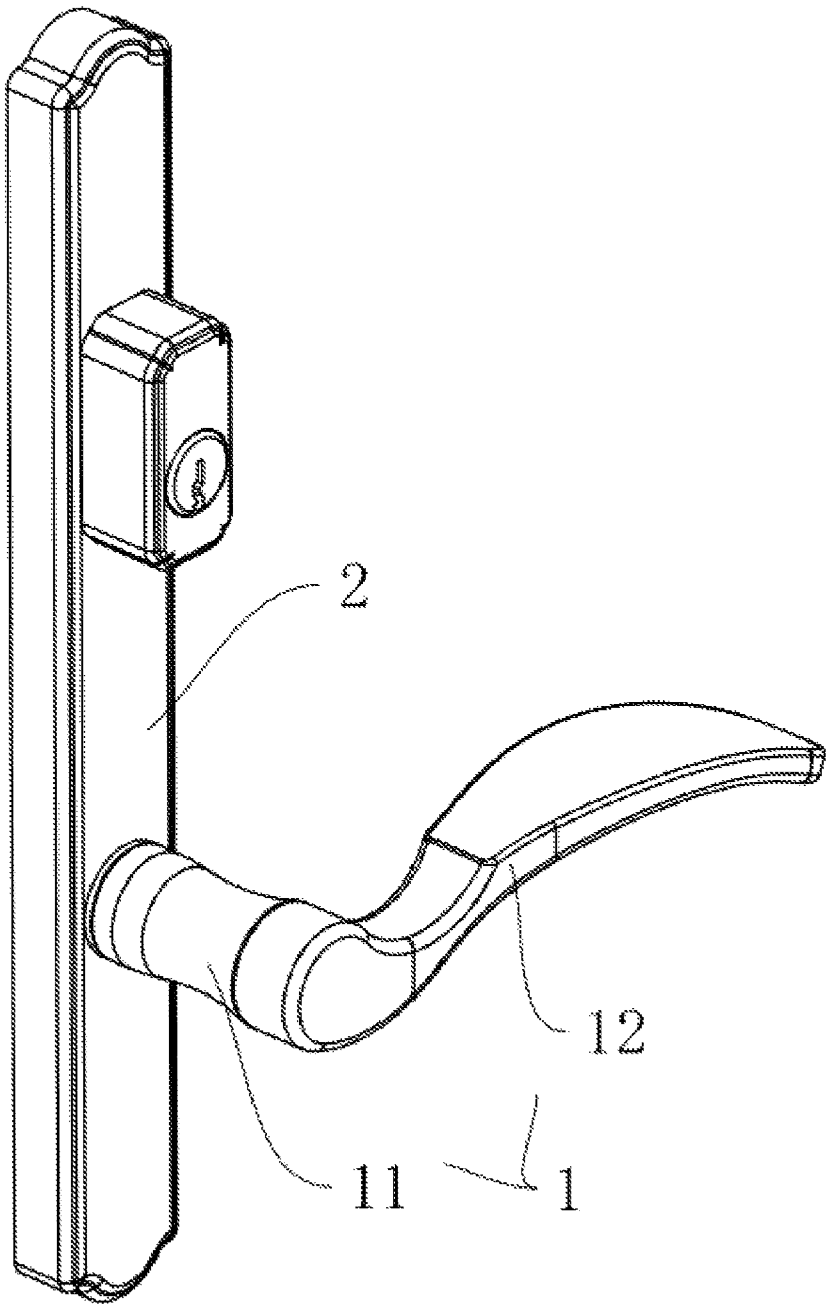
FIG. 1 and FIG. 2 are axonometric views of a lock body located outside the door for quick assembly of a handle according to the present embodiment.
Figure 2:
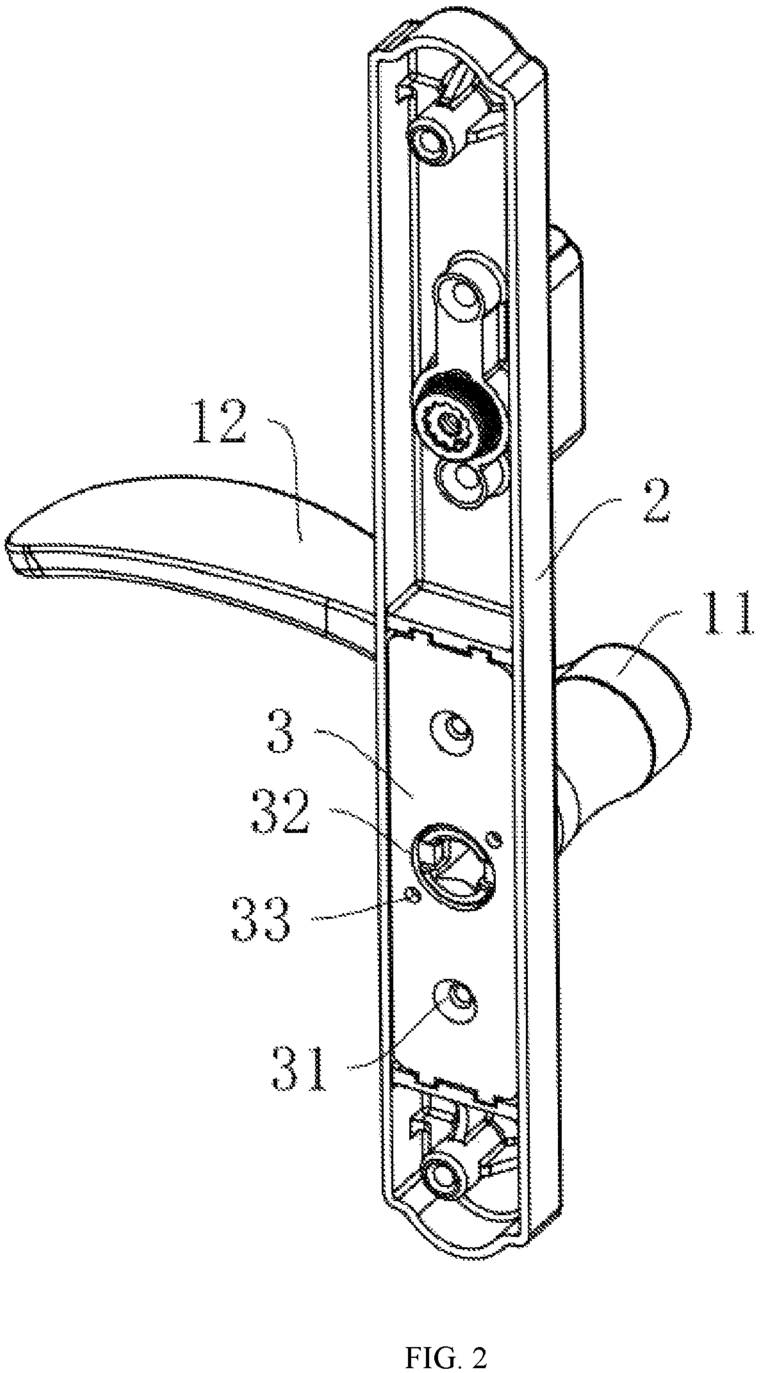
Figure 3:
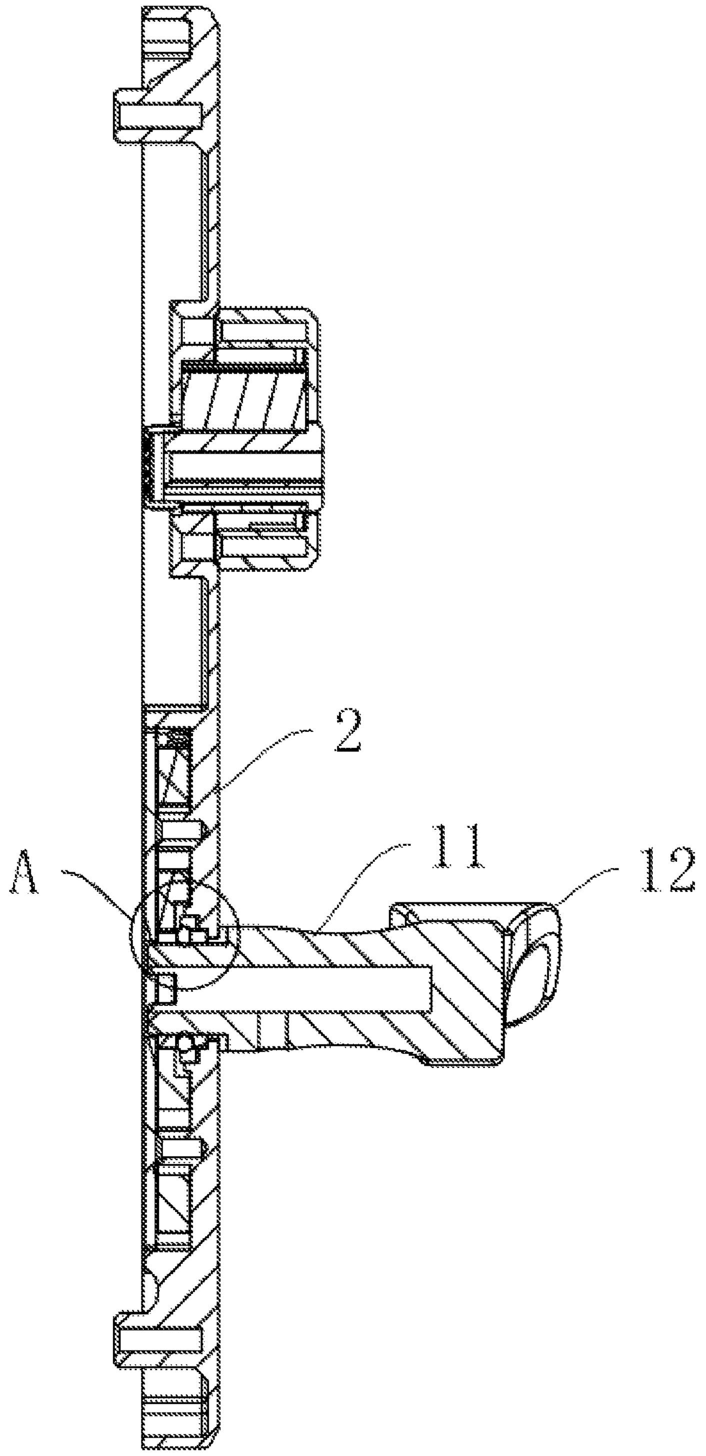
FIG. 3 is a cross-sectional view of the lock body located outside the door for quick assembly of a handle according to the present embodiment.

The names of the parts designated by the reference numerals in the above figures are as follows: 1: handle; 11: rotating part; 111: limiting ring groove; 112: first inserting groove; 113: third inserting groove; 12: hand-held part; 2: mounting seat; 21: through groove; 22: accommodating ring; 23: sliding groove; 231: second guide slope; 232: fitting surface; 24: internally threaded post; 3: baffle; 31: through hole; 32: via hole; 33: operating hole; 4: moving block; 41: kidney-shaped groove; 5: elastic member; 6: first holding ring; 61: first inserting block; 62: second inserting block; 7: second holding ring; 8: rolling body; 9: push-in ring; 91: sliding block; 911: first guide slope; 92: second inserting groove; 93: tangent plane; 94: arc-shaped groove; and 10: groove.

DETAILED DESCRIPTION OF THE DISCLOSURE

The present disclosure is further described in detail below with reference the accompanying drawings and embodiments.

EMBODIMENT

A lock body located outside the door for quick assembly of a handle, with reference to FIG. 1 to FIG. 11, includes a mounting seat 2 and a handle 1, where the handle 1 includes a rotating part 11 and a hand-held part 12 extending perpendicularly to one side at one end of the rotating part 11, the end of the rotating part 11 away from the handle 1 is provided with a third inserting groove 113 into which a transmission rod of a rectangular parallelepiped can be inserted, and the mounting seat 2 is provided with a through groove 21 into which the rotating part 11 can be inserted, which are both existing in the prior art.

A quick assembly mechanism for realizing axial limiting of the rotating part relative to the mounting seat 2 with the rotation of the rotating part 11 by a particular angle after the rotating part 11 is inserted into a designated position is provided in the mounting seat 2.

The quick assembly mechanism includes a push-in member, a limiting member and a holding part which are provided in the mounting seat 2. In conjunction with FIG. 10 and FIG. 11, the above-mentioned limiting member is preferably a ball-shaped rolling body 8, and one or more rolling bodies 8 can be distributed around the circumference of the rotating part 11. In this embodiment, 12 rolling bodies are provided, and the holding part includes a first holding ring 6 and a second holding ring 7 which are provided separately. In conjunction with FIG. 7, the opposite sides of the first holding ring 6 and the second holding ring 7 are provided with grooves 10 which can accommodate the local rolling body 8, and the bottom and the side wall of the groove 10 form arc-shaped transition to be fitted with the rolling body 8, which has the advantage that when the distance between the side walls of the two grooves 10 is the diameter of the rolling body 8, it is possible to limit that the rolling body 8 disengages from the two grooves 10. When the distance between the side walls of the two grooves 10 decreases from being greater than the diameter of the rolling body 8 to the diameter of the rolling body 8, the rolling body 8 which is partially placed outside can be accommodated back into the groove 10 again. In conjunction with FIG. 5, FIG. 6 and FIG. 9, the push-in member is a push-in ring 9 sleeving the exterior of the holding part, the inner ring wall of the push-in ring 9 is provided with, at the end away from the hand-held part 12, an arc-shaped groove 94 which can accommodate the partial rolling body 8, and when the groove 10 accommodates the rolling body 8, the arc-shaped groove 94 just fits with the rolling body 8. With the push-in action of the push-in ring 9, the rolling body 8 gradually disengages out of the arc-shaped groove 94. When the outer ring of the rolling body 8 disengages out of the arc-shaped groove 94, the inner ring wall of the push-in ring 9 radially abuts against the rolling body 8. A limiting ring groove 111 is provided on the outer ring wall of the end of the rotating part 11 away from the hand-held part 12. When the push-in ring 9 pushes and presses the first holding ring 6 to move to the side away from the second holding ring 7, the rolling body 8 is locally pushed and pressed into the limiting ring groove 111, and at this time, the axial limiting of the rotating part 11 relative to the mounting seat 2 is achieved.

Figure 6:
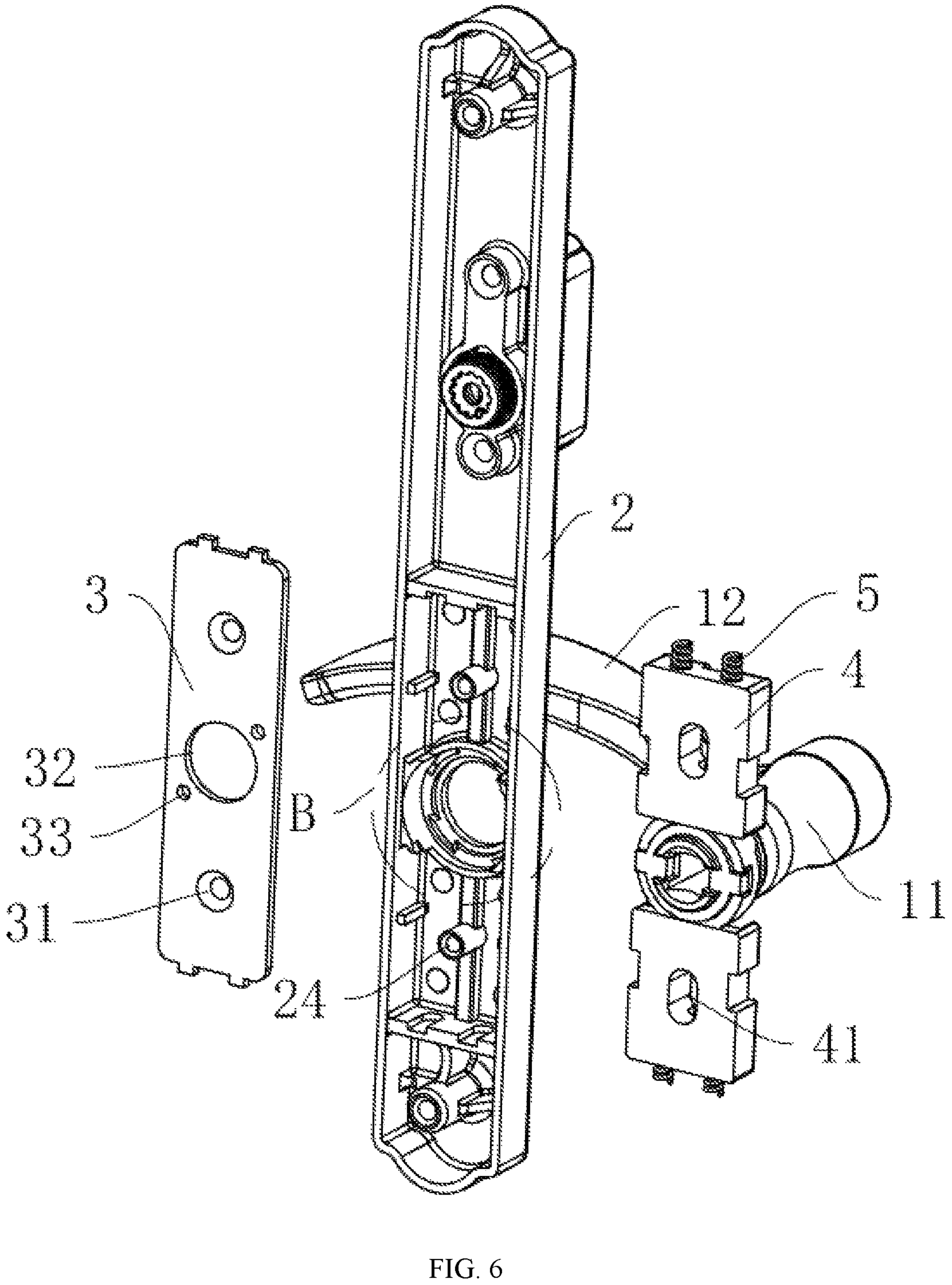
FIG. 6 is an exploded view of the lock body located outside the door for quick assembly of a handle according to the present embodiment.
Figure 7:
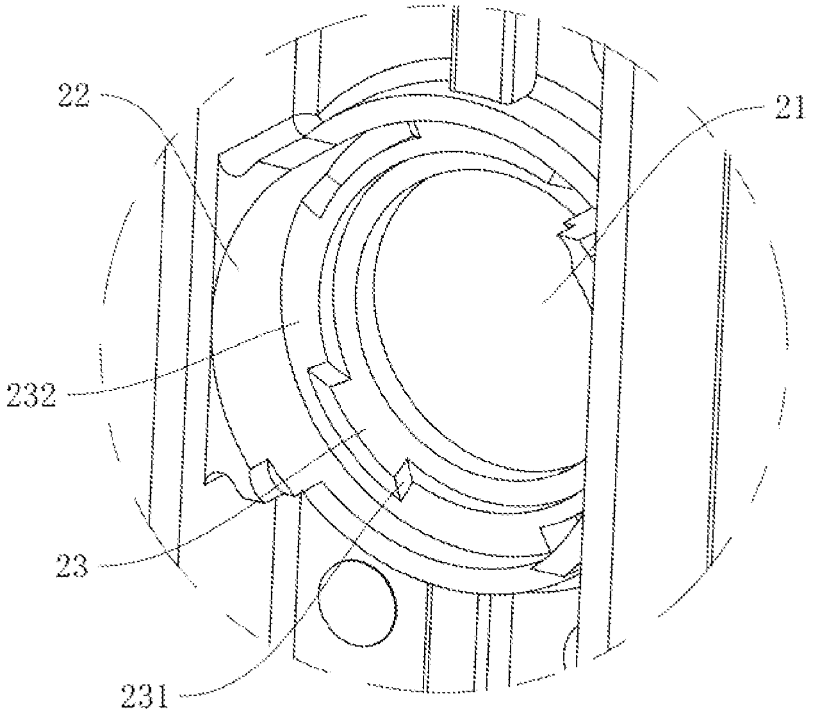
FIG. 7 is an enlarged view of B of FIG. 6.
Figure 8:
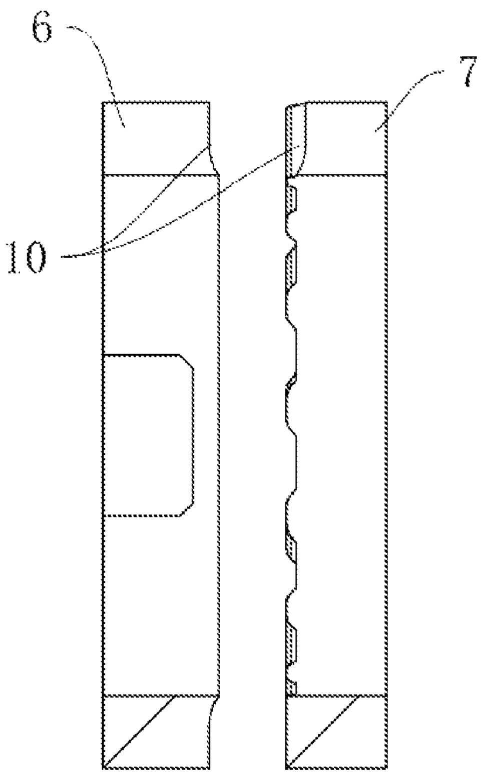
FIG. 8 is a front view of a holding part according to the present embodiment.

With reference FIG. 6, on the mounting seat 2, an accommodating ring 22 for the push-in ring 9 to stretch out and retract protrudes around the through groove 21, and a baffle 3 limiting the movement stroke of the first holding ring 6 is detachably fixed at the end of the mounting seat 2 away from the handle 1. By the accommodating ring 22 and the baffle 3, the push-in ring 9, the holding part, the rolling body 8, etc. can be mounted in the mounting seat 2.

The push-in action of the push-in member is controlled by the rotation of the rotating part 11. In order to achieve the above-mentioned object, an engagement structure is provided between the mounting seat 2, the quick assembly mechanism and the handle 1. The engagement mechanism includes a synchronization mechanism provided between the rotating part 11, the first holding ring 6 and the push-in ring 9 for driving the rotating part, the first holding ring and the push-in ring to rotate synchronously, and a push-in mechanism provided between the push-in ring 9 and the mounting seat 2 for driving the push-in ring 9 to achieve the push-in action in the axial direction of the rotating part 11 during rotation.

Figure 9:
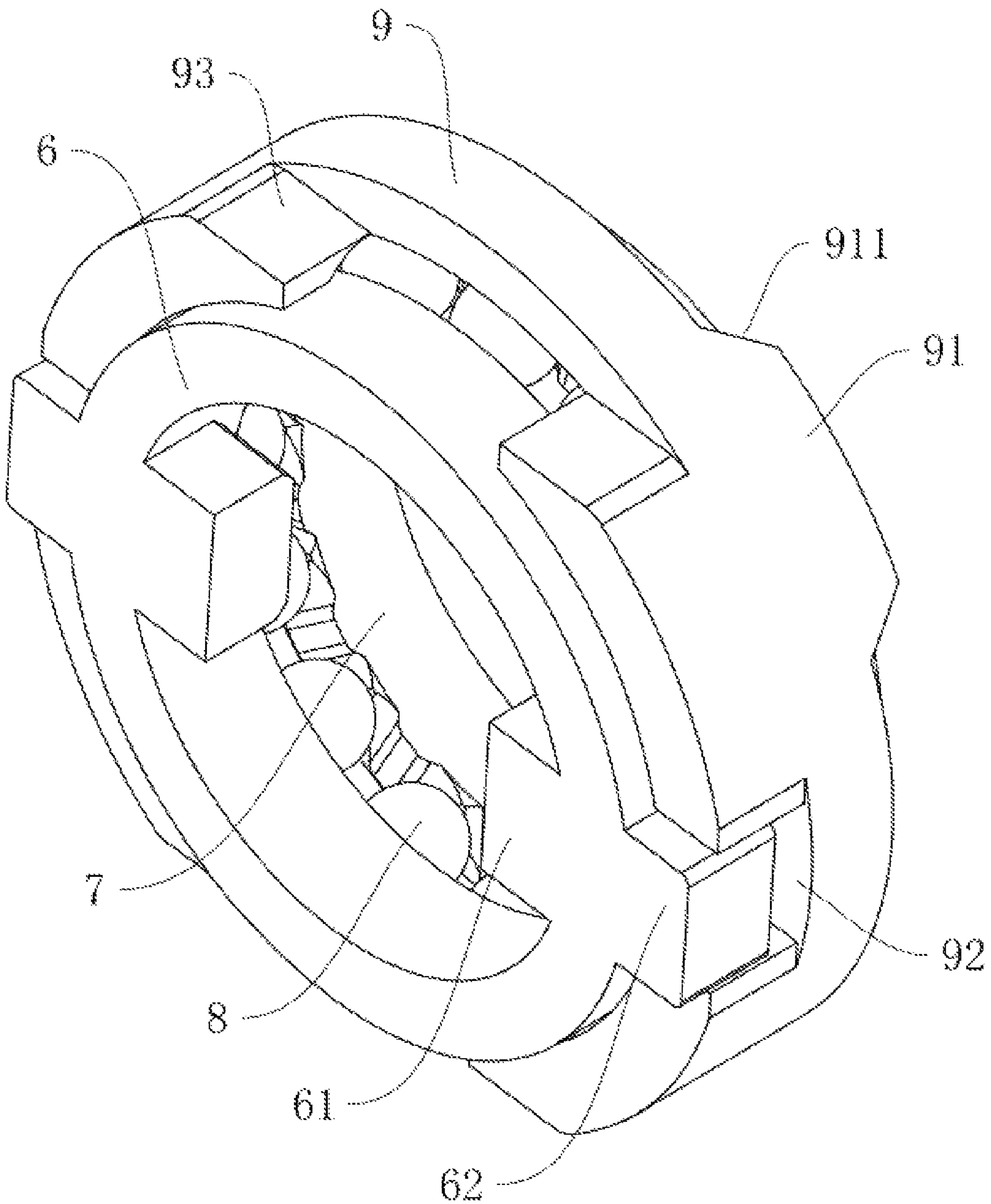
FIG. 9 is an axonometric view when the holding part, the rolling body and the push-in ring of the present embodiment are assembled.
Figure 10:
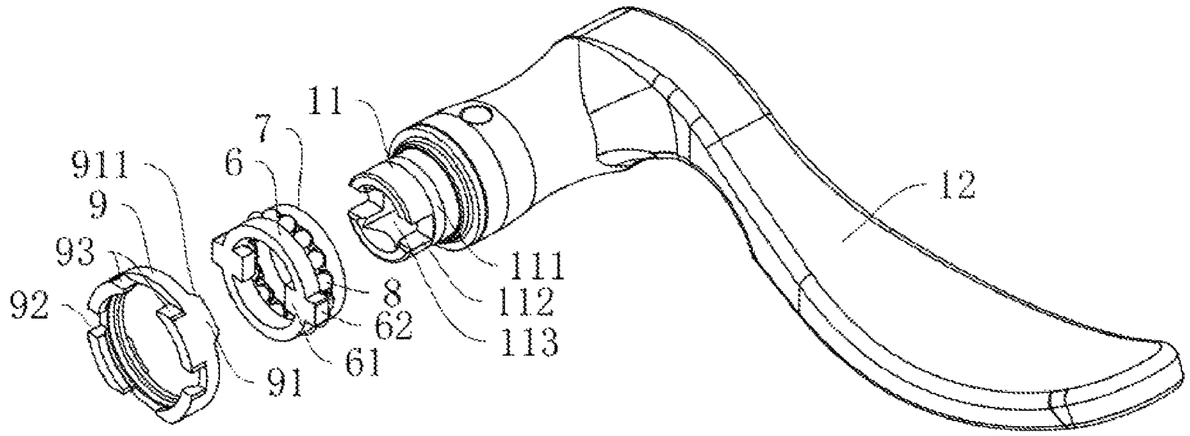
FIG. 10 and FIG. 11 are exploded views of the handle, the holding part, the rolling body and the push-in ring of the present embodiment.
Figure 11:
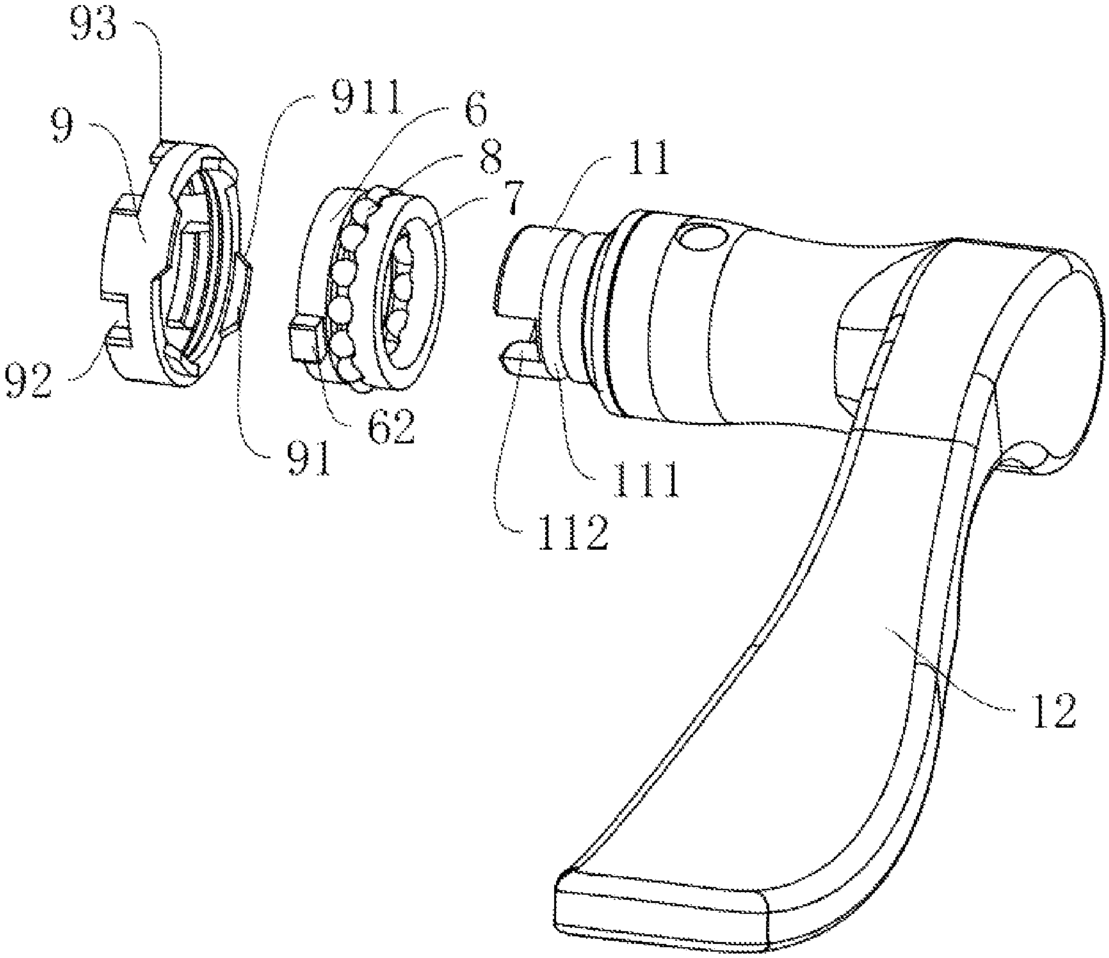

With reference to FIG. 9, the synchronous rotation mechanism includes a first inserting groove 112 recessed on both sides of the third inserting groove 113 at the end of the rotating part 11 away from the hand-held part 12, and a first inserting block 61 protruding on the inner ring wall of the first holding ring 6 and configured to be inserted into the first inserting groove 112. A second inserting block 62 protrudes on the outer wall of the first holding ring 6, and a second inserting groove 92 for the second inserting block 62 to be inserted in is provided on the side of the push-in ring 9 facing the first holding ring 6. By means of the above-mentioned structure, the push-in ring 9 and the first holding ring 6 have a movement tendency of synchronous rotation when the rotating part 11 rotates.

Figure 4:
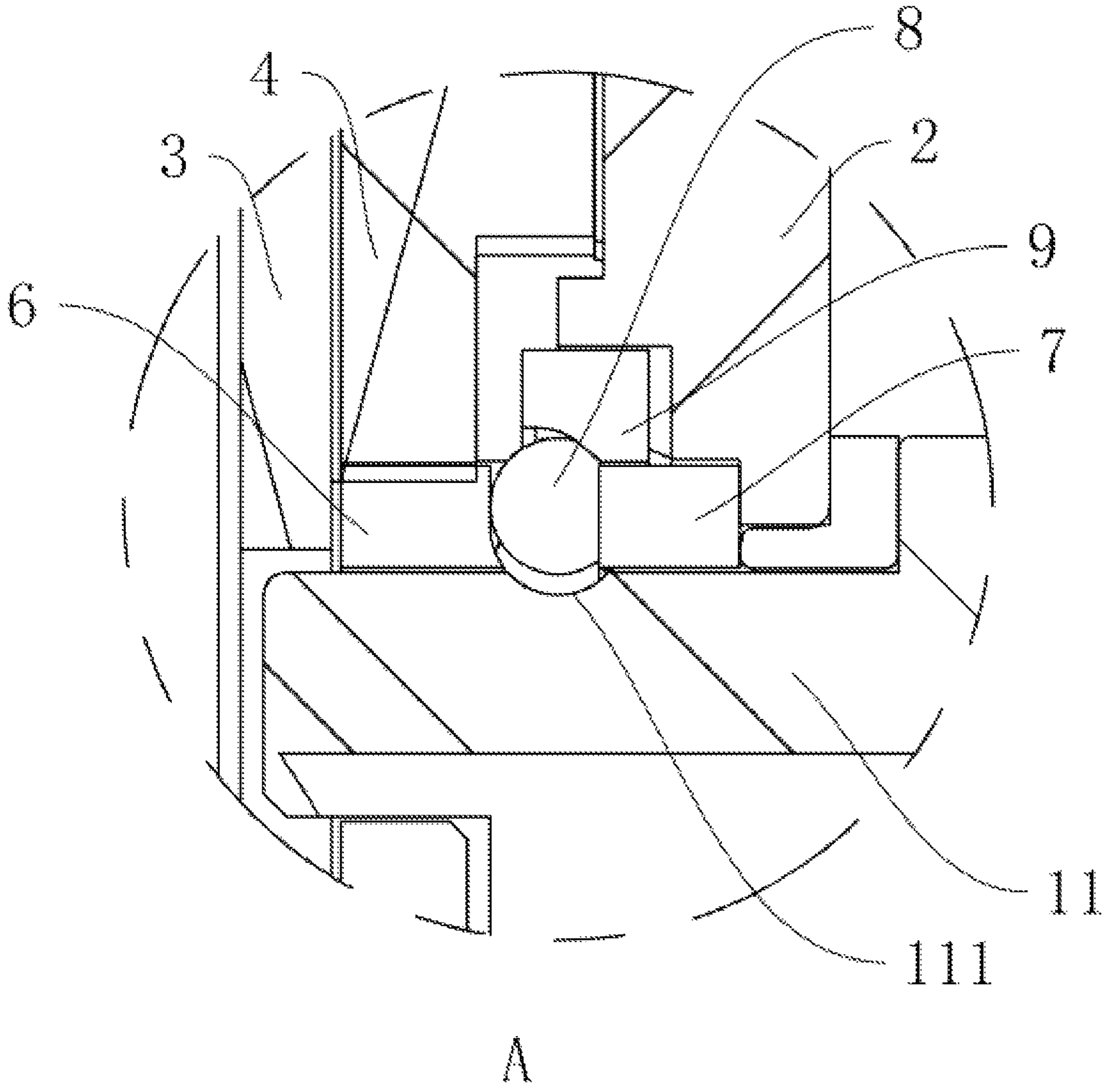
FIG. 4 is an enlarged view of A of FIG. 3.
Figure 5:
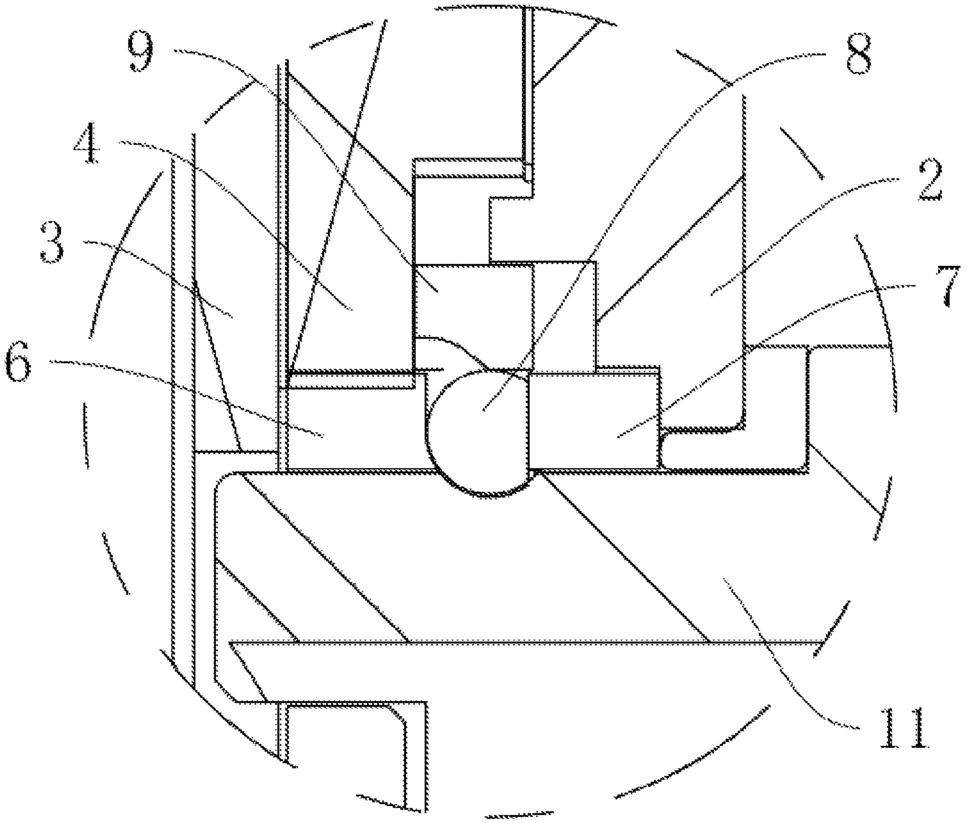
FIG. 5 is a cross-sectional view of a rolling body of FIG. 4 partially entering a limiting ring groove.

In conjunction with FIG. 4 to FIG. 6, the push-in mechanism includes a sliding block 91 protruding at the end of the push-in ring 9 close to the hand-held part 12, a fitting surface 232 provided on the side of the mounting seat 2 away from the hand-held part 12, and a sliding groove 23 recessed in the circumferential direction around the through groove 21 on the fitting surface 232 and configured for the sliding block 91 to be embedded and slide, and a lead-out mechanism facilitating the sliding block 91 to disengage out of the sliding groove 23 to be fitted with the fitting surface 232 is provided between the sliding block 91 and the sliding groove 23. In conjunction with FIG. 7, the lead-out mechanism includes first guide slopes 911 provided on both sides of the sliding block 91 and second guide slopes 231 provided on both sides of the sliding groove 23 and fitted with the first guide slopes 911. At least one set of sliding grooves 23 is distributed in a spaced mode in the axial direction of the rotating part 11, at least one sliding groove is provided for each set of sliding grooves, and each set of sliding grooves is concentrically provided with different circles, and the angle difference between each set of sliding grooves is greater than the rotating stroke after the rotating part 11 is mounted. The push-in distance of the push-in ring 9 is the depth at which the push-in ring 9 is inserted into the sliding groove 23. Therefore, when the sliding block 91 moves until the first guide slope 911 fits with the second guide slope 231, as the handle 1 continues to rotate, the sliding block 91 on the push-in ring 9 can be driven to gradually slide out of the sliding groove 23, and as the sliding block 91 slides out of the sliding groove 23, correspondingly, the push-in ring 9 performs a push-in movement in the direction of the first holding ring 6, so that the push-in ring 9 can simultaneously push away the first holding ring 6 and push and press the rolling body 8 to partially enter the limiting ring groove 111.

A holding mechanism for holding the hand-held part 12 in a horizontal state after the rotating part 11 is inserted into the through groove 21 is provided between the push-in ring 9 and the mounting seat 2. With reference to FIG. 6, the holding mechanism includes two tangent planes 93 provided in parallel on the outer wall of the push-in ring 9, and a moving block 4 provided on the mounting seat 2 by elastic sliding and configured to be close to or away from the push-in ring 9, the side of the moving block 4 close to the tangent plane 93 is a plane fitted with the tangent plane 93, an elastic member 5 which drives the moving block 4 to elastically abut against the tangent plane 93 is provided between the mounting seat 2 and the moving block 4, and the elastic member 5 is a spring or a tension spring, and is a spring in this embodiment. The end of the spring away from the moving block 4 elastically abuts against a baffle 3 in the mounting seat 2, a control part for controlling the moving direction of the moving block 4 and limiting the moving stroke thereof is provided between the mounting seat 2 and the moving block 4, and the control part includes a kidney-shaped groove 41 provided on the moving block 4 in the moving direction thereof, an internally threaded post 24 protruding on the mounting seat 2, a through hole 31 provided on the baffle 3, and a locking screw fitted with the internally threaded post 24 after successively passing through the through hole 31 and the kidney-shaped groove 41. The above-mentioned structure achieves the multiple effects of mounting the baffle 3 on the mounting seat 2, shielding the quick assembly mechanism, providing guiding and sliding of the moving block 4, and controlling the movement stroke.

The baffle 3 is provided with a via hole 32 which is concentric with the rotating part 11 and configured for the transmission rod to penetrate out, and two operating holes 33 are symmetrically provided on the baffle 3 with the via hole 32 as a center. An operator can pass a tool into the operating hole 33 so as to push and press the first holding ring 6 to the second holding ring 7, and the push-in ring 9 is extruded to retreat by the first holding ring 6 at the same time. The rolling body 8 completely enters the groove 10 again via the arc-shaped transition at the bottom of the groove 10, and disengages from the limiting ring groove 111. The handle 1 can be pulled out from the mounting seat 2.

The assembly process of the handle 1 includes the following steps: the handle 1 is inserted into the inserting groove while keeping the horizontal state of the hand-held part 12 and then rotated by a particular angle (less than) 90°, at this moment, the sliding block 91 of the push-in ring 9 slides completely out of the inserting groove 23 and is then rotated to the horizontal state of the handle 1, and then the handle 1 is kept in a horizontal state under the action of the moving block 4.

The disassembly process of the handle 1 includes the following steps: a thin rod is inserted into the operating hole 33 by one hand, the handle 1 is slowly rotated by one hand, and when the sliding block 91 is rotated to be directly opposite to the sliding groove 23, the thin rod is switched from being immovable to being movable in the direction of the handle 1. At this moment, the first holding ring 6 and the push-in ring 9 are simultaneously pushed in the direction of the sliding groove 23. During the pushing process, the rolling body 8 gradually disengages from the limiting ring groove 111. When the thin rod is inserted to be immovable, the rolling body 8 completely disengages from the limiting ring groove 111, and at this moment, the handle 1 is directly pulled out.

The invention claimed is:

1. A lock body located outside the door for quick assembly of a handle, the lock body comprising a mounting seat (2) and a handle (1), the handle (1) comprising a rotating part (11) and a hand-held part (12) extending perpendicularly to one side at one end of the rotating part (11), wherein the end of the rotating part (11) away from the hand-held part (12) is inserted into and fitted with the mounting seat (2), a quick assembly mechanism for realizing axial limiting of the rotating part (11) relative to the mounting seat (2) with the rotation of the rotating part (11) is provided in the mounting seat (2), the quick assembly mechanism comprises a limiting body, the limiting body is a rolling body (8), a limiting ring groove (111) is provided on an outer ring wall of the end of the rotating part (11) away from the hand-held part (12), a holding part which includes a first holding ring (6) and a second holding ring (7) which are provided separately, grooves (10) which can accommodate the local rolling body (8) are provided on the opposite sides of the first holding ring (6) and the second holding ring (7), and a push-in ring (9) sleeving the exterior of the holding part, and with the push-in action of the push-in member, a holding part is pushed open and the limiting body is pushed to partially enter the limiting ring groove (111).

2. The lock body located outside the door quick assembly of a handle according to claim 1, wherein at least one rolling body (8) is distributed in the circumferential direction around the rotating part (11).

3. The lock body located outside the door for quick assembly of a handle according to claim 2, wherein the holding part comprises a first holding ring (6) and a second holding ring (7) which are provided separately, grooves (10) which can accommodate the partial rolling body (8) are provided on the opposite sides of the first holding ring (6) and the second holding ring (7), and the rolling body (8) is configured to be completely accommodated between the two grooves (10) or partially disengaging to enter the limiting ring groove (111) as the distance between the first holding ring (6) and the second holding ring (7) changes.

4. The lock body located outside the door for quick assembly of a handle according to claim 3, wherein the bottom and the side wall of the groove (10) form arc-shaped transition to fit with the rolling body (8), the push-in member is a push-in ring (9) sleeving the exterior of the holding part, and the inner ring wall of the push-in ring (9) is provided with, at the end away from the hand-held part (12), an arc-shaped groove (94) which accommodates the partial rolling body (8).

5. The lock body located outside the door for quick assembly of a handle according to claim 4, wherein the mounting seat (2) is provided with a through groove (21) for the hand-held part (12) to be inserted in, in the mounting seat (2), an accommodating ring (22) for accommodating the push-in ring (9) extends around the through groove (21), and a baffle (3) for limiting the maximum movement stroke of the first holding ring (6) is detachably provided at the end of the mounting seat (2) away from the handle (1).

6. The lock body located outside the door for quick assembly of a handle according to claim 3, wherein an engagement structure is provided between the mounting seat (2), the quick assembly mechanism and the handle (1), and the engagement mechanism comprises a synchronization mechanism provided between the rotating part (11), the first holding ring (6) and the push-in ring (9) for driving the rotating part, the first holding ring and the push-in ring to rotate synchronously, and a push-in mechanism provided between the push-in ring (9) and the mounting seat (2) for driving the push-in ring (9) to achieve the push-in action in the axial direction of the rotating part (11) during rotation.

7. The lock body located outside the door for quick assembly of a handle according to claim 6, wherein the synchronous rotation mechanism comprises a first inserting groove (112) recessed at the end of the rotating part (11) away from the hand-held part (12) and a first inserting block (61) protruding on the inner ring wall of the first holding ring (6) and configured to be inserted into the first inserting groove (112), a second inserting block (62) protrudes on the outer wall of the first holding ring (6), and a second inserting groove (92) for the second inserting block (62) to be inserted in is provided on the side of the push-in ring (9) facing the first holding ring (6).

8. The lock body located outside the door for quick assembly of a handle according to claim 6, wherein the push-in mechanism comprises a sliding block (91) protruding from the end of the push-in ring (9) close to the hand-held part (12), a fitting surface (232) provided on the side of the mounting seat (2) away from the hand-held part (12), and a sliding groove (23) recessed in the circumferential direction around the through groove (21) on the fitting surface (232) and configured for the sliding block (91) to be embedded and slide, a lead-out mechanism facilitating the sliding block (91) to disengage from the sliding groove (23) to fit with the fitting surface (232) is provided between the sliding block (91) and the sliding groove (23), and the push-in distance of the push-in ring (9) is the depth at which the push-in ring (9) is inserted into the sliding groove (23).

9. The lock body located outside the door for quick assembly of a handle according to claim 8, wherein the lead-out mechanism comprises first guide slopes (911) provided on both sides of the sliding block (91) and second guide slopes (231) provided on both sides of the sliding groove (23) and fitted with the first guide slopes (911).

10. The lock body located outside the door for quick assembly of a handle according to claim 7, wherein at least one set of sliding grooves (23) are distributed in a spaced mode in the axial direction of the rotating part (11), at least one sliding groove is provided for each set of sliding grooves, each set of sliding grooves is concentrically provided with different circles, and the angle difference between each set of sliding grooves is greater than the rotating stroke after the rotating part (11) is mounted.

11. The lock body located outside the door for quick assembly of a handle according to claim 5, wherein a holding mechanism for holding the hand-held part (12) in a horizontal state after the rotating part (11) is inserted into the through groove (21) is provided between the push-in ring (9) and the mounting seat (2), the holding mechanism comprising two tangent planes (93) provided in parallel on the outer wall of the push-in ring (9), and a moving block (4) provided on the mounting seat (2) by elastic sliding and configured to be close to or away from the push-in ring (9), the side of the moving block (4) close to the tangent plane (93) being a plane fitted with the tangent plane (93), and an elastic member (5) which drives the moving block (4) to elastically abut against the tangent plane (93) being provided between the mounting seat (2) and the moving block (4).

* * * * *